United States Patent
Shin (10) Patent No.: US 8,847,114 B1
(45) Date of Patent: Sep. 30, 2014

(54) LASER-ASSISTED MICROMACHINING SYSTEM AND METHOD

(75) Inventor: Yung C. Shin, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 1325 days.

(21) Appl. No.: 12/116,768

(22) Filed: May 7, 2008

Related U.S. Application Data (60) Provisional application No. 60/927,996, filed on May 7, 2007.

(51) Int. Cl.
*B23K 26/06* (2014.01)
*B23K 26/02* (2014.01)

(52) U.S. Cl.
CPC *B23K 26/02* (2013.01); *B23K 26/06* (2013.01)
USPC ............ 219/121.74; 219/121.71; 219/121.75

(58) Field of Classification Search
USPC .............. 219/121.6, 121.65, 121.66, 121.68, 219/121.73, 121.74, 121.78, 121.79, 219/121.83, 121.84, 121.85; 408/19; 409/131–132, 135, 136, 139, 165, 166, 409/168
See application file for complete search history.

(56) References Cited

U.S. PATENT DOCUMENTS

| | | | | |
|---|---|---|---|---|
| 4,356,376 A | * | 10/1982 | Komanduri et al. | 219/121.72 |
| 4,667,080 A | * | 5/1987 | Juptner et al. | 219/121.74 |
| 5,160,824 A | | 11/1992 | Babel | |
| 5,906,459 A | | 5/1999 | Thomas et al. | |
| 6,043,453 A | * | 3/2000 | Arai | 219/121.68 |
| 6,393,687 B1 | * | 5/2002 | Friedrich | 29/560 |
| 6,465,756 B2 | * | 10/2002 | Tanaka et al. | 219/121.6 |
| 6,578,254 B2 | * | 6/2003 | Adams et al. | 29/606 |
| 6,666,630 B2 | * | 12/2003 | Zimmermann et al. | 409/132 |
| 7,002,100 B2 | | 2/2006 | Wu et al. | |
| 7,057,135 B2 | * | 6/2006 | Li | 219/121.83 |
| 7,257,879 B1 | | 8/2007 | Jancsó | |
| 2004/0179915 A1 | * | 9/2004 | Hill et al. | 409/131 |
| 2004/0222202 A1 | * | 11/2004 | Johnson et al. | 219/121.69 |
| 2005/0121428 A1 | * | 6/2005 | Risser et al. | 219/121.73 |
| 2005/0161444 A1 | * | 7/2005 | Kitai et al. | 219/121.73 |
| 2005/0211680 A1 | * | 9/2005 | Li et al. | 219/121.68 |
| 2006/0237397 A1 | * | 10/2006 | Yamazaki et al. | 219/121.6 |
| 2007/0062920 A1 | | 3/2007 | Shin | |

OTHER PUBLICATIONS

Effect of Laser Preheating the Workpiece on Micro-End Milling of Metals. Yongho Jeon and Frank Pfefferkorn. 2005 ASME International Mechanical Engineering Congress and Exposition. Nov. 5-11, 2005.*

(Continued)

*Primary Examiner* — Thien S Tran
(74) *Attorney, Agent, or Firm* — Hartman Global IP Law; Gary M. Hartman; Michael D. Winter (57) ABSTRACT

A novel apparatus and method for laser-assisted micro-milling. The disclosed laser-assisted micro-milling system and method provides unique micro-milling capabilities for very difficult-to-machine materials, such as ceramics, high temperature alloys and composites. A low power laser beam is focused at a very small spot, thus producing a very high power density, the spot being located just ahead of a mechanical micro-milling cutter to preheat the material prior to machining. This localized heating thermally weakens the workpiece resulting in lower cutting forces, improved surface finish, and longer tool life. The system is capable of micro-milling difficult-to-machine materials that may be conductive or non-conductive with high material removal rates compared to existing systems and methods.

22 Claims, 5 Drawing Sheets

(56) References Cited

OTHER PUBLICATIONS

Teresko, John, "The Benefits of Laser-Assisted Micro Machining," [online], Oct. 1, 2007 [retrieved on May 4, 2008] Retrieved from the Internet: <http://www.industryweek.com/ReadArticle.aspx?ArticleID=14997>.

Singh, Ramesh K., "Laser Assisted Mechanical Micromachining of Difficult-to-Machine Materials," [online], Mar. 15, 2006 [Retrieved on May 4, 2008] Retrieved from the internet: <http:/smartech.gatech.edu/handle/1853/13199>.

Singh, Ramesh K., "Laser Assisted Mechanical Micromachining of Hard-to-Machine Materials," doctoral thesis, Georgia Institute of Technology, Dec. 2007.

Tian, Y., et al., "Laser-assisted milling of silicon nitride ceramics," ASME Int. Conf. on Manuf. Science and Engineering, Oct. 8-11, 2006, Ypsilanti, MI.

Nakao, Y., et al., 2003, "Diamond turning using position and AE dual feedback control system," Precision Engineering, vol. 27, 2003, pp. 117-124.

Lee, D. E., et al. 2006, "Precision manufacturing process monitoring with acoustic emission," International Journal of Machine Tools and Manufacture, vol. 46, 2006, pp. 176-188.

Tansel, I., et al., "Micro-endmilling-III. Wear estimation and tool breakage detection using acoustic emission signals," International Journal of Machine Tools and Manufacture, vol. 38, 1998, pp. 1449-1466.

"Using Laser Beam Expanders," Edmund Optics Technical Support [online], © 2008 [retrieved MAy 14, 2008]. Retrieved from the Internet: <http://www.edmundoptics.com/techsupport/displayarticle.cfm?articleid=270&search=1>.

Parallax Technology, Inc. Frequently Asked Questions [online], undated [retrieved on May 14, 2008] Retrieved from the Internet: <http://www.parallax-tech.com/faq.htm>.

"Laser Beam Expanders Basics and Applications," [online], undated [retrieved on May 14, 2008]Retrieved from the Internet: <http://www.optoscience.com/maker/linos/linos-catalog/fileadmin/user_upload/Dateien/Technical_papers/Optolines_bmx_englisch.pdf>.

"Laser Beam Expander Theory," [online], undated [retrieved on May 14, 2008]Retrieved from the Internet: <http://www.specialoptics.com/Theory/Pg%2022%20Laser%20Beam%20Expander%20Theory.pdf>.

Shelton, Jonathan A. et al., "An Experimental Evaluation of Laser-Assisted Micromilling of Two Difficult to Machine Alloys," © 2008 ASME, 2008 ASME International Conference on Manufacturing Science and Engineering, Evanston, IL.

Shin, Y. C. et al., "Laser-Assisted Machining: Its Potential and Future," Machining Technology, vol. 11, No. 3, Third Quarter 2000, pp. 1-6.

Rozzi, Jay C. et al., "Transient, Three-Dimensional Heat Transfer Model for the Laser Assisted Machining of Silicon Nitride: I. Comparison of Predictions with Measured Surface Temperature Histories," International Journal of Heat and Mass Transfer, vol. 43, 2000, pp. 1409-1424.

Rozzi, Jay C., et al., "Experimental Evaluation of the Laser Assisted Machining of Silicon Nitride Ceramics," Transaction of the ASME, vol. 122, Nov. 2000, pp. 666-670.

Rebro, Patrick A. et al., "Comparative Assessment of Laser-Assisted Machining for Various Ceramics," North American Manufacturing Research Institution of the Society of Manufacturing Engineers Conference, May 21-24, 2002, West Lafayette, IN.

Rebro, Patrick A. et al., "Laser-Assisted Machining of Reaction Sintered Mullite Ceramics," Journal of Manufacturing Science and Engineering, vol. 124, Nov. 2002, pp. 875-885.

Rebro, Patrick A. et al., "Design of Operating Conditions for Crackfree Laser-Assisted Machining of Mullite," International Journal of Machine Tools & Manufacture, vol. 44, 2004, pp. 677-694.

Pfefferkorn, Frank E. et al., "Laser-Assisted Machining of Magnesia-Partially-Stabilized Zirconia," Journal of Manufacturing Science and Engineering, vol. 126, Feb. 2004, pp. 42-51.

Lei, S. et al., "Experimental Investigation of Thermo-Mechanical Characteristics in Laser-Assisted Machining of Silicon Nitride Ceramics," Journal of Manufacturing Science and Engineering, vol. 123, Nov. 2001, pp. 639-646.

Lei, S. edt al., "Deformation Mechanisms and Constitutive Modeling for Silicon Nitride Undergoing Laser-Assisted Machining," International Journal of Machine Tools & Manufacture, vol. 40, 2000, pp. 2213-2233.

Zhang, C. et al., "A Novel Laser-Assisted Truing and Dressing Technique for Vitrified CBN Wheels," International Journal of Machine Tools & Manufacture, vol. 42, 2002, pp. 825-835.

\* cited by examiner

LASER-ASSISTED MICROMACHINING SYSTEM AND METHOD

CROSS-REFERENCE TO RELATED APPLICATION

This application claims the benefit of U.S. Provisional Patent Application No. 60/927,996, filed May 7, 2007, which application is hereby incorporated by reference.

FIELD OF THE INVENTION

The present invention generally relates to laser-assisted material processing, and more particularly to systems and methods for performing micro-scale laser-assisted machining.

BACKGROUND OF THE INVENTION

Micromachining can be difficult to apply to many engineering materials due to a variety of scaling induced factors including: low cutting speeds, high relative tool deflections and runout, and increased material strength at smaller size scales. Additionally, edge burrs which can easily be removed after macro-scale machining must be avoided in micromachining due to the lack of available finishing operations. A fundamental change in the cutting process occurs when the uncut chip thickness falls below a minimum value. Below this minimum chip thickness the work material is ploughed by the tool instead of being cleanly sheared away, resulting in increased cutting forces, surface roughness, and a decrease in machined edge quality. Some hard materials such as ceramics and high temperature alloys will further increase the wear on the cutting tool.

Specific cutting energy at the micro-scale is much higher than at the macro-scale owing to the well known size-effect in machining operations and the relative dullness of micro tools. This dullness is due to limits on how small the cutting edge radius can be made. Typically, conventional machining systems have an edge radius to diameter ratio of $1\times10^{-6}$ while micromachining systems often has a ratio greater than 0.005. These issues result in higher relative cutting forces which cannot be sustained by micro-sized cutting tools. For micromachining systems this typically leads to failure of the tool by complete fracture at the flute starting location.

Therefore, there is a need for a laser-assisted micromachining system which can precisely cut hard objects while maintaining a high edge quality and decreasing the wear on a cutting tool to achieve prolonged tool life.

SUMMARY OF THE INVENTION

A general object of the invention is to overcome problems associated with conventional micromachining. One aspect of the invention is a laser-assisted micro-milling system including a high-speed spindle which holds a micro-milling tool, in combination with a laser that is optically aligned sequentially with a beam expander, a focusing element, and a target spot substantially adjacent to a working end of the micro-milling tool. The workpiece material to be machined is locally preheated by a focused laser beam prior to machining.

According to another aspect of a laser-assisted micro-milling system according to the present invention, a tool holder on a machine frame holds a micro-milling tool, and a laser is optically aligned sequentially with a beam expander, a focusing element, and a target spot substantially adjacent to a working end of the micro-milling tool. The workpiece to be machined is locally preheated by a focused laser beam prior to machining.

Another aspect of the present invention is a laser-assisted micro-milling method with includes moving a workpiece material relative to a micro-cutting too, producing a laser beam, expanding the laser beam, and focusing the expanded laser beam on a target spot on the workpiece material so as to locally preheat the target spot prior to machining thereof with a micro-milling tool.

DETAILED DESCRIPTION OF PREFERRED EMBODIMENTS

For the purpose of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device and such further applications of the principles of the invention as illustrated therein being contemplated as would normally occur to one skilled in the art to which the invention relates.

Figure 1A:
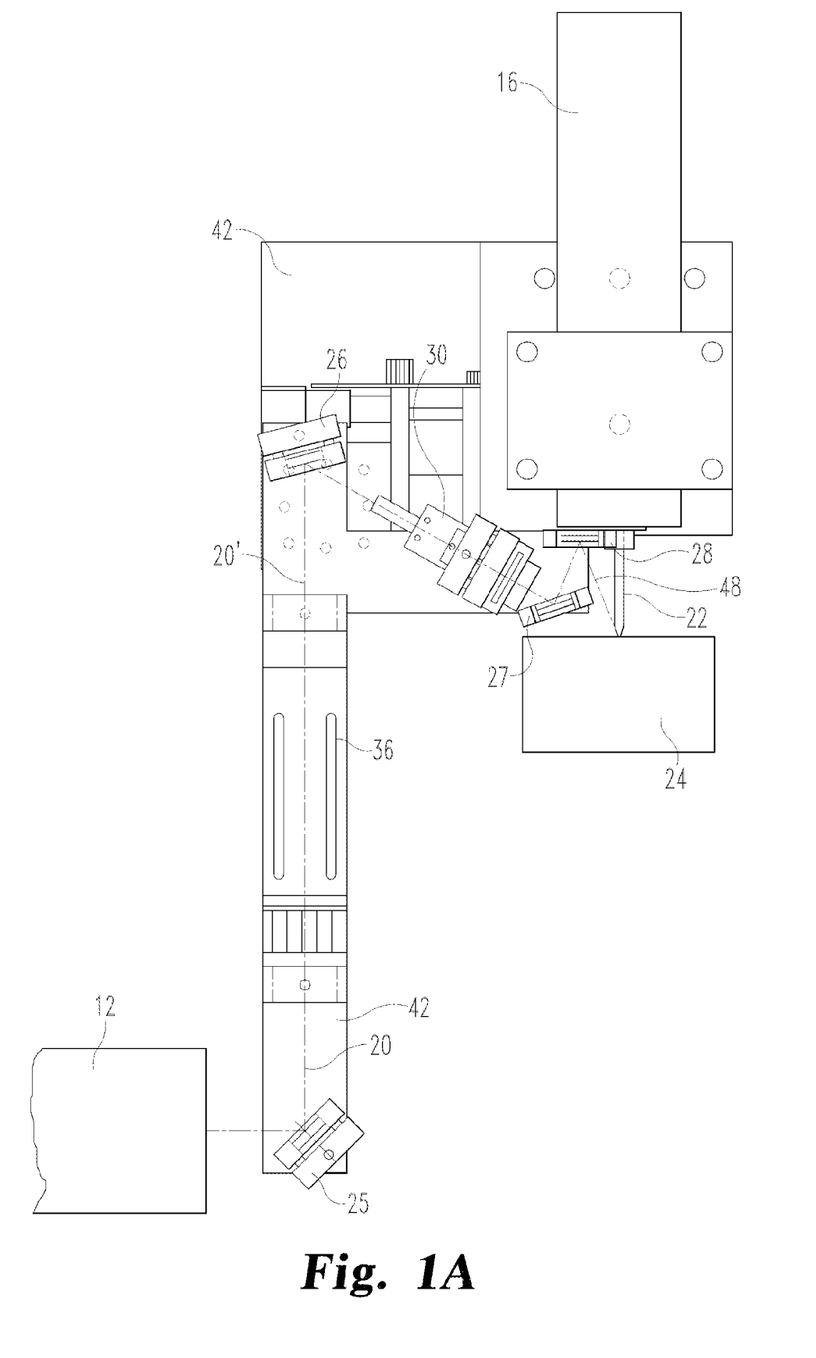
FIG. 1A illustrates a front view of one embodiment of a laser-assisted micro-milling system according to the present invention, including the entire path of the laser beam.
Figure 1B:
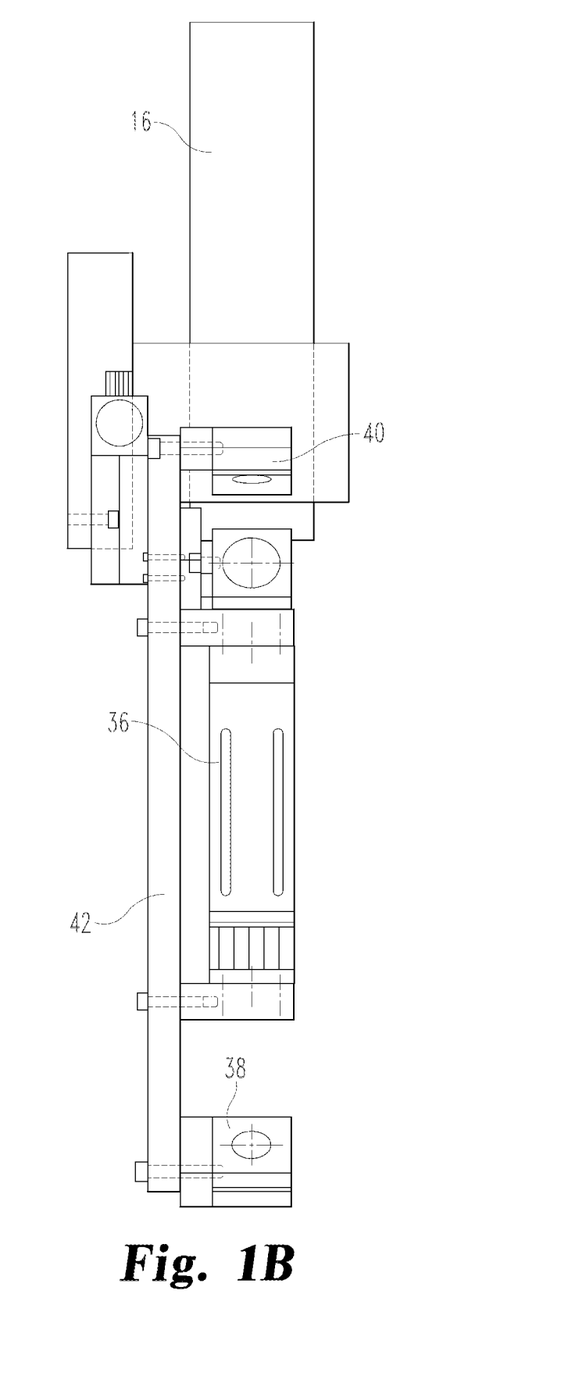
FIG. 1B illustrates a left side view of the laser-assisted micro-milling system of FIG. 1A.

One application of a novel apparatus for micromachining in accordance with the present invention is to facilitate machining of difficult-to-machine materials on a micro-scale. FIG. 1 illustrates one embodiment of a laser-assisted micro-milling system 10 according to the present invention. The disclosed embodiment has a focusing element 30 and a beam expander 36 mounted along with a set of mirrors 25, 26, 27 and 28 on a fixture plate 42 which is designed to be mounted on the frame of a milling machine that has multi-axis movable computer controlled stage (not shown) which supports a workpiece material 24 to be cut by a micro-milling tool 22 held by a high-speed spindle 16. The high-speed spindle 16 may operate at 90,000 revolutions per minute or higher and is capable of holding the micro-milling tool 22 such as a micro-endmill which may have a diameter of 10-200 microns (μm).

A laser beam 20 generated by a laser 12 is reflected by the first mirror 25 into the beam expander 36, which increases the beam diameter to yield an expanded laser beam 20'. The laser beam 20 passes through the beam expander 36 and the expanded beam 20' is reflected by the second mirror 26 into the focusing element 30. The laser beam 20' passes through the focusing element 30 to yield a focused laser beam 20" (FIG. 4), which is reflected by the third mirror 27 onto the fourth mirror 28, which reflects the laser beam 20" onto the workpiece material 24. In the depicted embodiment the beam path from the fourth mirror 28 to the workpiece material 24 forms the final stage path 48 of the laser beam 20". The final stage path 48 is the final straight-line beam path segment of the laser beam 20", which interacts with the workpiece material 24.

The angle of incidence the final stage path forms with the workpiece material is between zero and 45°, preferably less than 30°, and more preferably 10-15°. The lower the angle of incidence of a laser beam, the more circular the spot is on the workpiece and the greater effect it has on the workpiece material 24. The angle of incidence is the angle formed between the final stage path of a laser and the perpendicular of the workpiece material where the laser beam interacts with the workpiece material. In instances where the workpiece material has an uneven surface the angle of incidence is understood to be the angle formed by the final stage path and the longitudinal axis of the micromachining tool.

Mirrors may be incorporated into the arrangement to make the beam path of the beams 20, 20' and 20" occupy a smaller work space by incorporating reflecting angles into the beam path. The first, second, third and fourth mirrors 25, 26, 27, 28 can be configured to reflect the laser beams 20, 20' and 20" and introduce an angle between zero and 180 degrees into the final stage path 48 of the laser beam 20" so that the laser beam 20 will pass through the beam expander 36 and then the expanded beam 20' will pass through the focusing element 30. The first, second, third, and fourth mirrors 25, 26, 27, 28 can be coupled to the fixture plate 42 to optically align the laser 12, beam expander 36, and focusing element 30 in a more compact work space than if the laser 12, beam expander 36, and focusing element 30 were oriented in an optically equivalent straight line fashion. The various optical elements described above are considered optically aligned in that the beam 20 emitted from the laser 12 reflects off the mirror 25 and passes through the beam expander 36, the expanded beam 20' reflects off the mirror 26 and passes through the focusing element 30, and then the focused beam 20" reflects off the mirrors 27 and 28. The relative positioning of the focusing element 30, mirrors 27 and 28, and cutting tool 22 determines the target spot on the workpiece 24. The first mirror 25, second mirror 26, third mirror 27, and fourth mirror 28 are available from a number of sources, for example Laser Research Optics, Part No. MM-0508-M-UC, 14 mm. The mirrors 25, 26, 27 and 28 need to be able to withstand the heat of the laser beams 20, 20' and 20". Molybdenum mirrors can be used to provide durability due to its intrinsically hard surface.

A variety of focusing elements are available from a number of sources, for example, a Selies LX focusing lens from Laser Research Optics, Part No. LX-0730-Z-ET1.8. A zinc selenide lens has a low absorption of energy, which is suitable for laser applications. A variety of focusing elements can be used in the disclosed embodiment. Focusing elements are understood to include a variety of focusing optics. Examples of focusing optics include various lenses, mirrors, prisms, diffractive optical elements, and zone plates. The focal length of the focusing element 30 affects the beam diameter as the laser beam 20' passes through the focusing element 30. The shorter the focal length of the focusing element 30, the smaller the beam diameter is at the focal point after passing through the focusing element 30 compared to focusing elements having a longer focal length. The diameter of the laser beam 20" at the focal point of the focusing element is known as the spot size. The spot size is proportional to the focal length of the focusing element 30. The focal length of the focusing element 30 in the disclosed embodiment is less than 100 millimeters, and may be in the range of 10-20 mm for example.

The spot size is also affected by the diameter of the laser beam 20' before it enters the focusing element 30. A larger beam diameter before entering the focusing element 30 yields a smaller beam diameter at the focal point after passing through the focusing element 30 compared to a smaller diameter laser beam 20' before entering the focusing element 30. The spot size is inversely proportional to the diameter of the laser beam 20' before passing through the focusing element 30. Therefore the smallest spot size is achieved when the focal length of the focusing element 30 is smaller and the beam diameter before passing through the focusing element 30 is larger.

However the spot size cannot be made infinitely small because the wavelength of the laser beam represents the theoretical minimum diameter under perfect conditions. The wavelength of a typical $CO_2$ laser is 10.6 microns, and therefore 10.6 microns is the smallest theoretical spot size of typical $CO_2$ laser beam. The spot size is theoretical because it could only be achieved if lenses and mirrors could have zero aberrations and if a laser could have zero diffraction and divergence. Such an arrangement cannot be achieved in the physical world due to opposing physical optimization techniques. The effect of laser diffraction and divergence are minimized when the beam diameter is large and the focal length of a lens is short. However the effect of lens aberration is minimized when the beam diameter is small and the focal length of a lens is long. The opposing configurations to minimize optical imperfections prohibit the theoretical minimum spot size from being attained in the real world.

Figure 2:
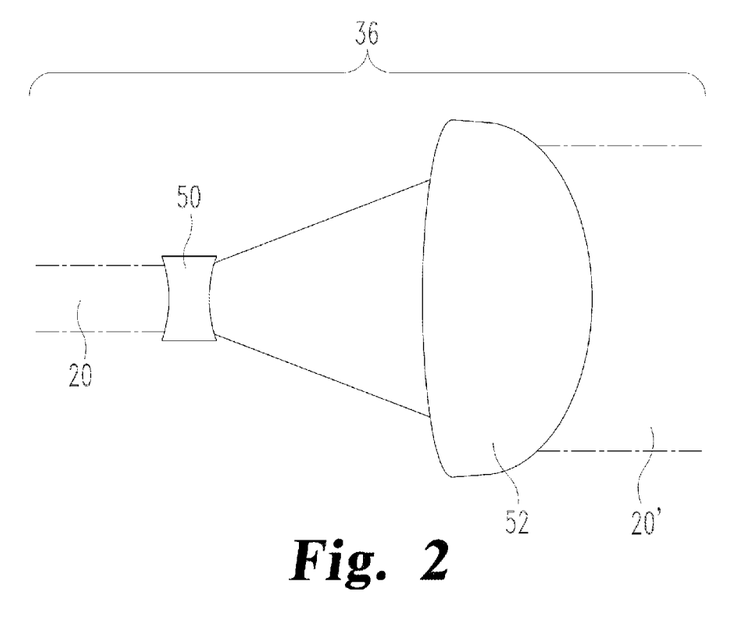
FIG. 2 illustrates components of the beam expander and the effect of those components on a laser beam.

The beam expander 36 is used to enlarge the diameter of the laser beam 20' before passing through the focusing element 30. FIG. 2 illustrates how the diameter of the laser beam 20 is expanded when passing through the beam expander 36. The beam expander 36 can be comprised of an entrance optics plano-concave lens 50 and exit optics objective lens 52. The beam expander power is equal to the ratio of the effective focal length of the exit optics objective lens 52 to the effective focal length of the entrance optics plano-concave lens 50. The physical separation between the objective lens 52 and the entrance lens 50 is equal to the sum of their back focal lengths. The result of the laser beam 20 passing through the beam expander 36 is the laser beam 20' having a larger beam diameter than the beam 20 that entered the beam expander 36. The beam expander 36 is available from a number of sources, for example a Synrad COL 2.5 beam expander, which increases the diameter of an incoming beam by a factor of 2.5. Other beam expanders are also contemplated, including a flexible or adjustable beam expander, i.e., one capable of varying the output beam diameter.

Figure 3:
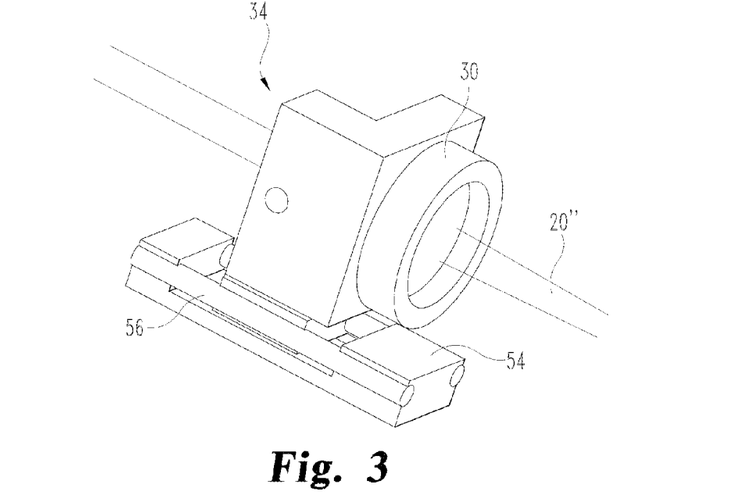
FIG. 3 illustrates the slidable universal lens holder.

FIG. 3 illustrates a slidable universal optics holder 34. The slide housing 54 can be mounted on fixture plate 42. Slide rails 56 are coupled to the slide housing 54. The universal optics holder 34 is slidably coupled to the slide rails 56 whereby the position of the universal optics holder 34 can be adjusted along a path parallel to the beam path of the beam 20". The focusing element 30 is coupled to the universal optics holder 34, and adjusting the position of the universal optics holder 34 thereby adjusts the position of the focusing element 30. The ability to adjust the position of the focusing element 30 allows the laser beam 20" to be optimally focused on the workpiece material 24 as various focusing elements are used and when the position of the workpiece material 24 moves. The slidable universal optics holder 34 is available from a number of sources, for example Edmund Industrial Optics, Part No. NT38-531.

Figure 4:
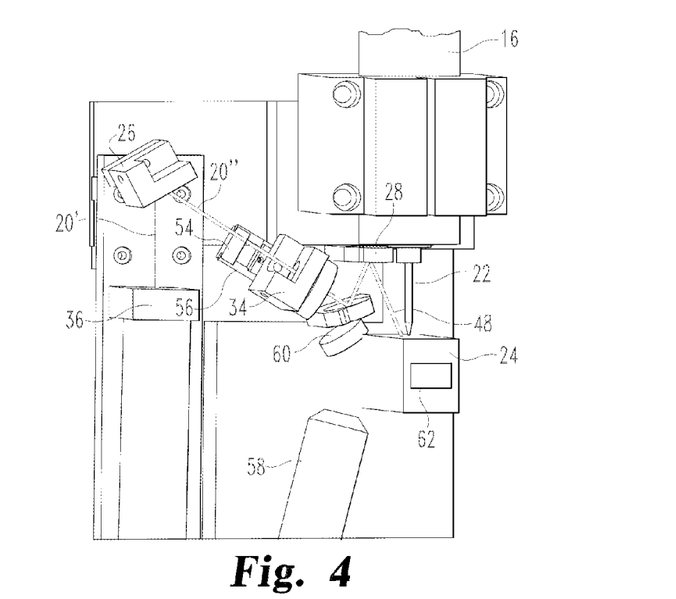
FIG. 4 illustrates a partial path of the laser beam in the laser-assisted micro-milling system and illustrates an embodiment with a slidable universal lens holder, a high-resolution digital camera, a nozzle, and an acoustic imaging sensor.

FIG. 4 illustrates an embodiment incorporating the slidable universal lens holder 34. The diameter of the laser beam 20 is increased by the beam expander 36 as noted above. The expanded laser beam 20' is reflected off the second mirror 26 and then passes through the focusing element 30. The position of the focusing element 30 can be adjusted by sliding the universal optics holder 34 along the slide rails 56 which are parallel to the beam path of the beam 20". After passing through the focusing element 30 the laser beam 20" is reflected off the third mirror 27 onto the fourth mirror 28 and reflected off the fourth mirror 28 onto the workpiece material 24 at a point substantially adjacent to the micromachining tool 22.

The optical arrangement shown in FIG. 4 was designed with the intent of shortening the focal length and creating a very small spot size while substantially avoiding vibration problems. This setup allows the micromachining tool 22 to be held directly by the high speed spindle 16 and not by a complex arrangement of collets and bearings. In order to provide the requisite final stage path 48 of the beam 20" and also to allow for adjustment of the focusing element 30, the several mirrors 25, 26, 27, 28 are mounted to the fixture plate 42 in the disclosed embodiment. Among other alternative arrangements contemplated for use as part of the present invention, such as an arrangement which eliminates mirrors 25 and 26 by aligning the beam expander 36 and focusing element 30 on a line at an angle of about 30 degrees from vertical, e.g., such as the angle at which a high-resolution digital camera 58 is mounted in FIG. 4. As another alternative, focusing element 30 may be replaced by a parabolic mirror suitably oriented to receive the output beam 20' from the beam expander 36 oriented at an angle of about 30 degrees from vertical and to reflect and focus that beam 20" onto the target spot.

The focused laser beam 20" may be between a nanometer and a millimeter in diameter for some applications, e.g., in the range of 20-800 μm, but the beam 20" preferably has a diameter of 20-200 μm and, in one embodiment, has a diameter of about 80-150 μm. The focused beam 20" provides the requisite heating immediately ahead of the micromachining tool 22 during laser-assisted micromachining. For example, with a 100-micron-diameter focused beam 20" and a 100-micron-diameter micromachining tool 22, the center of the focused laser beam 20" is substantially adjacent and preferably 50-100 microns from the outer surface of the tool 22. That is, the center-to-center spacing is preferably 100-150 microns. Substantially adjacent means the center-to-center distance ranges from equal to the average diameter of the cutting tool 22 and the spot size to ten times the average diameter of the cutting tool 22 and the diameter of the spot size. Separating the focused laser beam 20" from the micromachining tool 22 helps shield the micromachining tool 22 from the heating effect of the laser beam 20" and increases tool life.

The arrangement also allows for different diameter cutting tools to be used. Due to the small focal diameter of the laser beam, it is possible to elevate the workpiece material temperature to over 1000° C. with a low power laser. At the elevated temperature, the micromachining tool 22 removes material with a material removal rate higher than existing methods. In particular, this process provides an effective means of machining difficult-to-machine materials such as ceramics and high temperature alloys, which conventional mechanical micromachining tools cannot machine. A variety of lasers are available, for example a Synrad 10 W $CO_2$ laser with, for example, a 3.5 mm beam diameter.

The camera 58 can be mounted to the fixture plate 42. A fifth mirror 60 is attached to the fixture plate 42 whereby the cutting action of the micromachining tool 22 is reflected to the high-resolution digital camera 58 by the fifth mirror 60. The high-resolution digital camera 58 is understood to be optically aligned with the cutting action of the micromachining tool 22 in this orientation. This arrangement operates as an in-process control device to monitor the cutting action. A variety of high-resolution cameras can be used, for example Edmund Optics, Part number E0-3112.

An acoustic imaging sensor 62 can be incorporated into the laser-assisted micromachining system. The acoustic emissions generated during machining can be used for process monitoring and assessment. The cutting action propagates at frequencies in the 100-1000 kHz range, leading to almost zero background noise. The acoustic imaging sensor can be connected to a matching preamplifier and data acquisition card with software being used for all signal processing. Physical Acoustics software is an example of a suitable acoustic processing software. An acoustic imaging sensor 62 mechanically coupled to the workpiece material can measure the acoustic emissions generated by the micromachining tool 22 contacting the workpiece material 24. The acoustic imaging sensor 62 can be used to quantitatively evaluate the effect of the laser-assisted micromachining system on the workpiece material 24. The acoustic imaging sensor 62 can monitor the cutting tool contact with the workpiece material, tool wear, material removal temperature, and effects of depth of cut. There is a positive correlation between acoustic emissions and tool wear, and between acoustic emissions and axial depth of cut. The effectiveness of laser-assisted micromachining is shown by studies which report that acoustic emissions were reduced by up to 75% when the workpiece material was heated to above 350 degrees Celsius. Therefore there is a negative correlation between acoustic emissions and workpiece temperature. A variety of acoustic imaging sensors can be used, for example, Physical Acoustics, part number WDU. Additional description of acoustic emission sensors can be found in the following publications, which are incorporated by reference: Nakao, Y., et al., 2003, "Diamond turning using position and AE dual feedback control system," *Precision Engineering*, Vol. 27, 2003, pp. 117-124; Lee, D. E., et al., 2006, "Precision manufacturing process monitoring with acoustic emission," *International Journal of Machine Tools and Manufacture*, Vol. 46, 2006, pp. 176-188; and Tansel, I., et al., "Micro-endmilling-III. Wear estimation and tool breakage detection using acoustic emission signals," *International Journal of Machine Tools and Manufacture*, Vol. 38, 1998, pp. 1449-1466.

A nozzle (not shown) can be attached to the fixture plate 42 allowing for an adjustable flow of assist gas to be directed toward the cutting tool 22 while the laser-assisted micromachining system 10 is in use. Inert gas is used to quickly blow chips away from the zone where the cutting tool 22 interacts with the workpiece material 24. This reduces the likelihood that chips removed from the workpiece material 24 interfere with the path of the laser beam 20". Inert gas is used to prevent excessive oxidation or burning of the workpiece material and to reduce the residue which could accumulate on the laser-assisted micromachining system 10. Liquid should not be used to remove chips from the cutting zone because accumulation of liquid on the workpiece material 24 can alter the effect the laser beam 20" has on the workpiece material 24. Another reason liquid is not used to remove the chips is because splash back can result in the liquid collecting on the components of the laser-assisted micromachining system 10 further altering the effect the laser beam 20" has on the workpiece material 24.

The micromachining tool 22 and the laser beam 20" are in a fixed position during the machining operation while the workpiece material 24 moves relative to the micromachining tool 22 and laser beam 20" to achieve the desired cutting action. The workpiece material 24 is detachably coupled to a three-axis precision computer controlled stage (not illustrated). The workpiece material can be coupled to the controlled stage using a standard vise, a vacuum type vise or other similar means to detachably couple the workpiece material 24 to the controlled stage. A controlled stage with more than three axes can also be implemented and a rotary work 10 holding device can be added to perform contouring operations. Also a controlled stage with less than three axis could be implemented. Since the cutting tool 22 and the laser beam 20" are fixed the precision of the cutting will depend on the precision of the controlled stage. A controlled stage with a resolution of 0.5 micron is therefore preferred. The entire operation including the controlled stage movement and laser power is controlled by a CNC program. A variety of controlled stages can be used, for example, Aero tech, Part number A TS 125-100 (XYZ stages).

Figure 5:
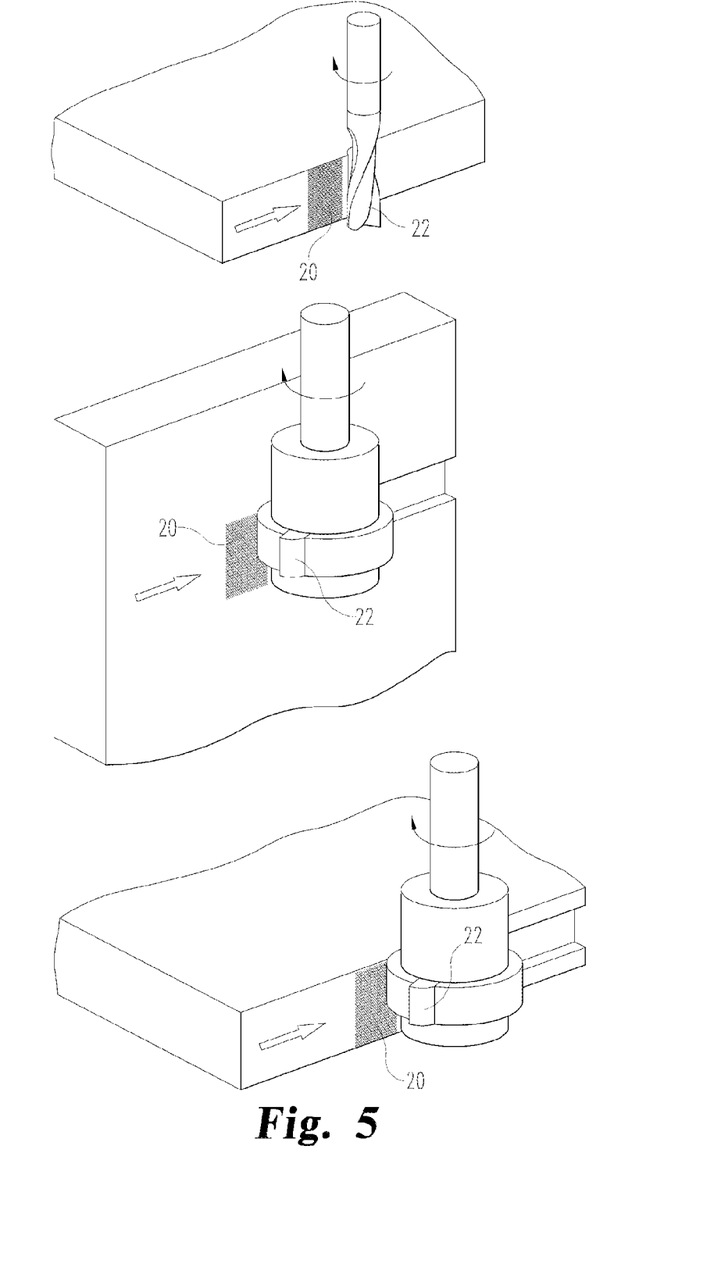
FIG. 5 illustrates a variety of cutting tools which can perform cutting actions on a workpiece material.

The laser-assisted micromachining system 10 can be configured to perform laser-assisted micromachining using different cutting tools 22 as illustrated in FIG. 5. This set-up can also include a rotary cutting tool 22 to perform contouring operations. Techniques to optimize the effect of the laser on the workpiece material can be found in the following publications, which are incorporated by reference: Tian, Y., et al., "Laser-assisted milling of silicon nitride ceramics," *ASME Int. Conf. on Manuf. Science and Engineering*, Oct. 8-11, 2006, Ypsilanti, Mich.; and Shelton, J. et al., "An experimental evaluation of laser-assisted micromilling of two difficult to machine alloys," *Proceedings of MSEC*2008, 2008 *ASME International Conference on Manufacturing Science and Engineering*, Evanston, Ill.

While the invention has been illustrated and described in detail in the drawings and foregoing description, the same is to be considered as illustrative and not restrictive in character, it being understood that only preferred embodiments have been shown and described and that all changes and modifications that come within the spirit of the invention are desired to be protected. For example, while there are significant differences between milling and turning operations, certain principles of the present invention may be usefully applied in certain applications to laser-assisted micromachining on a lathe or other equipment using micro-cutting tools.

What is claimed is:

1. A laser-assisted micro-milling system adapted to perform a machining operation on a workpiece material, the system comprising:
    a spindle disposed so that said spindle and said workpiece material define a workspace therebetween;
    a micro-milling tool held by said spindle;
    a laser generating a laser beam;
    means for fixturing said micro-milling tool and said laser in fixed positions relative to each other during the machining operation performed by the system;
    a beam expander optically aligned with said laser and expanding said laser beam generated thereby to yield an expanded laser beam;
    a focusing element optically aligned with said beam expander and optically aligned with said laser via said beam expander for focusing said expanded laser beam to yield a focused laser beam having a fixed position that is fixed by said fixturing means relative to said micro-milling tool, said focusing element being optically aligned with a target spot on the workpiece material and substantially adjacent to a working end of said micro-milling tool such that the workpiece material is locally preheated by said focused laser beam prior to machining locally preheated workpiece material with a cutting section of said micro-milling tool;
    first and second mirrors located at least partially within said workspace and positioned with respect to said spindle so as to optically align said focusing element and said target spot such that said focused laser beam from said focusing element is reflected away from the workpiece material by said first mirror onto said second mirror and reflected by said second mirror toward the workpiece material to said target spot, said second mirror being oriented so that a final stage path of said focused laser beam has an angle of incidence of less than 30 degrees with a perpendicular of a surface of the workpiece material, said angle of incidence being fixed by said fixturing means relative to said micro-milling tool; and
    means for moving the workpiece material relative to said micro-milling tool and said focused laser beam as said locally preheated workpiece material is being machined by said cutting section of said micro-milling tool.

2. The system of claim 1, wherein said laser is configured to generate said laser beam with a diameter greater than 1 mm, said beam expander is configured to increase said diameter of said laser beam generated by said laser, said focused laser beam has a diameter at said target spot of less than 500 µm on the workpiece material, and said focused laser beam at said target spot has a cross-section on the workpiece material with a substantial width in relation to a length thereof.

3. A laser-assisted mechanical micro-milling system adapted to perform a machining operation on a workpiece material, the system comprising:
    a machine frame having a spindle mounted thereon;
    a micro-milling tool held by said spindle;
    a laser generating a laser beam;
    a fixturing plate mounted to said machine frame and fixturing said micro-milling tool and said laser in fixed positions relative to each other during the machining operation performed by the system;
    a beam expander optically aligned with said laser and expanding said laser beam generated thereby to yield an expanded laser beam;
    a focusing element optically aligned with said beam expander and optically aligned with said laser via said beam expander for focusing said expanded laser beam to yield a focused laser beam having a fixed position that is fixed by said fixturing plate relative to said micro-milling tool, said focusing element being optically aligned with a target spot on the workpiece material and substantially adjacent to a working end of said micro-milling tool such that the workpiece material is locally preheated by said focused laser beam prior to machining locally preheated workpiece material with a cutting section of said micro-milling tool; and
    a controlled stage mounted to said frame for moving the workpiece material relative to said micro-milling tool and said focused laser beam as said locally preheated workpiece material is being machined by said cutting section of said micro-milling tool.

4. The system of claim 3, wherein said laser is configured to generate said laser beam with a diameter greater than 1 mm, said beam expander is configured to increase said diameter of said laser beam generated by said laser, said focused laser beam has a diameter at said target spot of less than 500 µm on the workpiece material, and said focused laser beam at said target spot has a cross-section on the workpiece material with a substantial width in relation to a length thereof.

5. A laser-assisted micro-milling method for perform a machining operation on a workpiece material, the method comprising:

positioning a spindle having a micro-milling tool mounted thereto so that said spindle and said workpiece material define a workspace therebetween;

moving the workpiece material relative to said micro-milling tool;

producing a laser beam;

expanding said laser beam generated by said laser to yield an expanded laser beam; and focusing said expanded laser beam to yield a focused laser beam on a target spot on the workpiece material so as to locally preheat the workpiece material at said target spot and then machining locally preheated workpiece material with said micro-milling tool;

wherein the focused laser beam is optically aligning with first and second mirrors located at least partially within said workspace and positioned with respect to said spindle such that said focused laser beam is reflected away from the workpiece material by said first mirror onto said second mirror and reflected by said second mirror toward the workpiece material and onto said target spot, said second mirror being oriented so that a final stage path of said focused laser beam has an angle of incidence of less than 30 degrees with a perpendicular of a surface of the workpiece material; and wherein said micro-milling tool and said focused laser beam are in fixed positions relative to each other and the workpiece material moves relative to said micro-milling tool and said focused laser beam during the machining operation.

6. The method of claim 5, wherein said focused laser beam has a diameter of approximately 20 to 200 microns at said target spot substantially adjacent to said micro-milling tool.

7. The system of claim 4, wherein said beam expander is configured to provide two-dimensional beam expansion of said laser beam generated by said laser, wherein said focusing element comprises a spherical lens, and wherein said beam expander and said focusing element are configured to focus said focused laser beam to approximately 20 to 200 microns at said target spot substantially adjacent to said micro-milling tool.

8. The system of claim 7, wherein said cutting section of said micro-milling tool has a diameter in a range of approximately 10 to 200 microns.

9. The system of claim 3, further comprising a universal optics holder configured to receive a variety of said focusing elements.

10. The system of claim 5, wherein said universal optics holder is slidable parallel to a path of said laser beam generated by said laser.

11. The system of claim 3, wherein said focusing element has a focal length of 30 mm or less.

12. The system of claim 3, wherein said focusing element has a focal length of more than 30 mm and less than 60 mm.

13. The system of claim 3, wherein said focusing element has a focal length of 60 mm or more and less than 100 mm.

14. The system of claim 3, further comprising first and second mirrors positioned with respect to said spindle so as to optically align said focusing element and said target spot such that said focused laser beam from said focusing element is reflected away from the workpiece material by said first mirror onto said second mirror and reflected by said second mirror toward the workpiece material to said target spot.

15. The system of claim 14, wherein said second mirror is configured so that a final stage path of said focused laser beam has an angle of incidence of less than 30 degrees with a perpendicular of a surface of the workpiece material, said angle of incidence being fixed by said fixturing plate relative to said micro-milling tool.

16. The system of claim 3, wherein said beam expander is configured to increase a diameter of said laser beam generated by said laser by an expansion ratio of 1 to less than 3.

17. The system of claim 3, wherein said beam expander is configured to increase a diameter of said laser beam generated by said laser by an expansion ratio of 3 to 10.

18. The system of claim 3, wherein said controlled stage is a controlled stage of a CNC machine, and said controlled stage is movable with a resolution ranging from 0.5 to 20 microns along one or more axes configured to move the workpiece material to said cutting section of said micro-milling tool.

19. The system of claim 18, wherein said CNC machine is configured to adjust a power level of said laser beam generated by said laser with a resolution ranging from 0.1 W to 1.0 W.

20. The system of claim 3, further comprising a high-resolution digital camera optically aligned with said cutting section of said micro-milling tool.

21. The system of claim 3, further comprising a nozzle configured to direct a stream of inert gas at said cutting section of said micro-milling tool.

22. The system of claim 3, further comprising an acoustic imaging sensor configured to respond to vibrations emitted by the workpiece material upon contact by said cutting section of said micro-milling tool.

* * * * *